(12) United States Patent
Liang et al.

(10) Patent No.: US 10,782,791 B2
(45) Date of Patent: Sep. 22, 2020

(54) TIME DOMAIN FEATURE TRANSFORM FOR USER GESTURES

(71) Applicant: Intel Corporation, Santa Clara, CA (US)

(72) Inventors: Zhiqiang Liang, Shanghai (CN); Tingqian Li, Songjiang District (CN); Jinkui Ren, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/777,981

(22) PCT Filed: Dec. 22, 2015

(86) PCT No.: PCT/CN2015/098176
§ 371 (c)(1),
(2) Date: May 22, 2018

(87) PCT Pub. No.: WO2017/107035
PCT Pub. Date: Jun. 29, 2017

(65) Prior Publication Data
US 2018/0329506 A1    Nov. 15, 2018

(51) Int. Cl.
*G06F 3/01* (2006.01)
*G06F 3/0346* (2013.01)
*G06F 3/038* (2013.01)

(52) U.S. Cl.
CPC .............. *G06F 3/017* (2013.01); *G06F 3/038* (2013.01); *G06F 3/0346* (2013.01)

(58) Field of Classification Search
CPC ........ G06F 3/017; G06F 1/1694; G06F 1/163; G06F 3/0488
See application file for complete search history.

(56) References Cited

U.S. PATENT DOCUMENTS 5,376,947 A    12/1994   Kuroda
9,141,194 B1 *  9/2015   Keyes ................... G06F 3/017
(Continued)

FOREIGN PATENT DOCUMENTS

CN    104423566 A    3/2015
CN    108431761 A    8/2018
(Continued)

OTHER PUBLICATIONS

"International Application Serial No. PCT/CN2015/098176, International Search Report dated Sep. 5, 2016", 4 pgs.
(Continued)

*Primary Examiner* — Shaheda A Abdin
(74) *Attorney, Agent, or Firm* — Schwegman Lundberg & Woessner, P.A.

(57) ABSTRACT

Systems and methods for recognizing a gesture in a wearable device are disclosed. The system may sense a plurality of sensor measurements during a gesture sensing session, and down-sample the measurements using an adaptive down-sampling interval. The adaptive down-sampling interval may be determined based at least on a fractional part of a ratio of a frame length of the sensor measurements to a specified target length shorter than the frame length. The magnitude of the down-sampled measurements is normalized, and a feature vector may be generated using the normalized measurements. A gesture recognizer module may associate a gesture with the feature vector using gesture classification.

20 Claims, 6 Drawing Sheets

(56) References Cited

U.S. PATENT DOCUMENTS

| | | | | |
|---|---|---|---|---|
| 2007/0041058 A1* | 2/2007 | Disatnik | ............... | G06F 3/0346 |
| | | | | 358/486 |
| 2007/0164856 A1* | 7/2007 | Egner | .................... | G06K 9/222 |
| | | | | 340/539.13 |
| 2010/0199227 A1* | 8/2010 | Xiao | ..................... | G06F 3/0481 |
| | | | | 715/863 |
| 2014/0240223 A1* | 8/2014 | Lake | ....................... | G08C 17/02 |
| | | | | 345/156 |
| 2016/0283783 A1* | 9/2016 | Yang | ................. | G06K 9/00342 |

FOREIGN PATENT DOCUMENTS

| | | |
|---|---|---|
| WO | WO-2011110267 A1 | 9/2011 |
| WO | WO-2017107035 A1 | 6/2017 |

OTHER PUBLICATIONS

"International Application Serial No. PCT/CN2015/098176, Written Opinion dated Sep. 5, 2016", 3 pgs.

"German Application Serial No. 112015007204.7, Office Action dated Aug. 7, 2018", w/Concise Statement of Relevance, 3 pgs.

"German Application Serial No. 112015007204.7, Response filed Aug. 22, 2018 to Office Action dated Aug. 7, 2018", w/Concise Statement of Relevance, 3 pgs.

\* cited by examiner

FIG. 5

TIME DOMAIN FEATURE TRANSFORM FOR USER GESTURES

This application is a U.S. National Stage Filing under 35 U.S.C. 371 from International Application No. PCT/CN2015/098176, filed on Dec. 22, 2015, and published as WO 2017/107035 on Jun. 29, 2017, which application is incorporated herein by reference in its entirety.

TECHNICAL FIELD

This document relates generally to wearable devices, and more particularly, to systems and methods for recognizing user gestures in a wearable device.

BACKGROUND

Mobile devices, such as smartphones and tablets, have functionalities to allow a user to interact with the device through different user activities. A device gesture may describe the user's movement of the device such as moving the device in hands, positioning, tilting, rotating, or shaking the device such as with respect to a reference position in the environment. Other user gestures, such as via a user interface on the mobile device, may include tapping, swiping, spreading, or pinching. A mobile device may recognize various gestures and translate them to corresponding commands to operate the device.

Wearable devices are miniature mobile devices developed for general or special purpose information technologies and media development. A wearable device may incorporate a computer and electronics and may be worn by users. The users may constantly interact with the device through various means including gestures. Examples of the wearable devices include smartwatches, smart activity trackers, smart glasses, and wearable health monitors.

Accurate and robust gesture recognition may enhance user experience of the wearable devices. However, gesture recognition may consume significant power and computational resources. Additionally, gestures may be non-periodic in nature and short in duration, and prone to noise or other sources of interferences. Conventional gesture recognition based on statistical features or frequency analysis may not provide desired recognition performance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Described herein are systems and methods for recognizing a gesture in a wearable device such as a smartphone or a smartwatch. Gesture recognition is based on time-domain transformation and feature extraction. A system described herein may sense a plurality of sensor measurements during a gesture sensing session, and down-sample the measurements using an adaptive down-sampling interval. The adaptive down-sampling interval may be determined based at least on a fractional part of a ratio of a frame length of the sensor measurements to a specified target length shorter than the frame length. The magnitude of the down-sampled measurements may be normalized, and a feature vector may be generated. A gesture recognizer module may associate a gesture with the feature vector using gesture classification.

Figure 1:
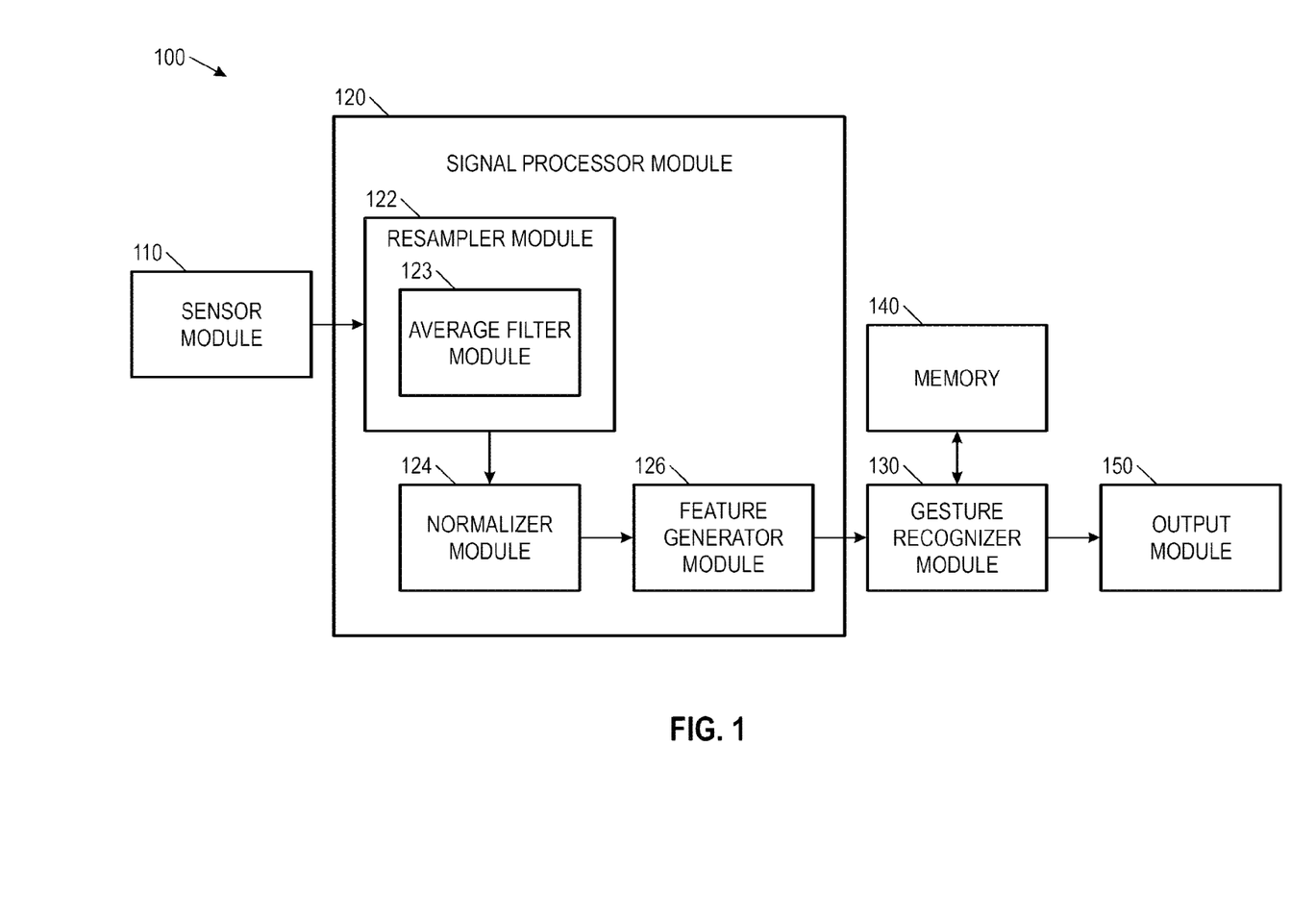
FIG. 1 illustrates, by way of example and not limitation, a diagram of a system for recognizing a gesture in a wearable device.

FIG. 1 illustrates, by way of example and not limitation, a diagram of a system 100 for recognizing a gesture in a wearable device. Examples of the gestures recognized by the system 100 may include device gestures describing various patterns of movement of a wearable device, or user gestures such as hand gestures corresponding to user commands to operate the wearable device. Examples of the wearable device may include smartwatches, smart wristband, smart glasses, wearable medical and health monitors, or other wearables. Other examples may include smartphones, tablets, or other mobile devices.

The system 100 may include a sensor module 110, a signal processor module 120, a gesture recognizer module 130, a memory 140, and an optional output module 150. In an example, the system 100 may include a wearable device that includes at least a portion of one or more of the sensor module 110, signal processor module 120, or the gesture recognition module 130. In some examples, one or more modules of the system 100 may be implemented as a part of a microprocessor circuit. The microprocessor circuit may be a dedicated processor such as a digital signal processor, application specific integrated circuit (ASIC), microprocessor, or other type of processor for processing information including sensor measurements such as received from the sensor module 110. Alternatively, the microprocessor circuit may be a general purpose processor that may receive and execute a set of instructions of performing the functions, methods, or techniques described herein.

In some examples, one or more modules of the system 100 may be implemented or executed in circuits or sub-circuits. These circuits may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The sensor module 110 may include a sense amplifier to sense a plurality of sensor measurements during a gesture sensing session. The sense amplifier may be coupled to one or more sensors on a mobile device or associated with the mobile device user. In an example, the sensor module 110 may include an accelerometer sensor that may produce a plurality of acceleration measurements during a gesture sensing session. The accelerometer may be a two- or three-dimensional accelerometer. In another example, the sensor module 110 may include a gyroscope sensor that may produce a plurality of orientation measurements during a gesture sensing session. Other examples of the sensors may include cameras, pressure sensors, temperature sensors, ultrasound sensors, or magnetometers, among others. The sensor measurements may be pre-processed, including amplification, digitization, filtering, or other signal conditioning operations. The pre-processed sensor measurements during the gesture sensing session may form a frame of a discrete-time digital signal with a frame length ($N_{Frame}$).

Figure 2A:
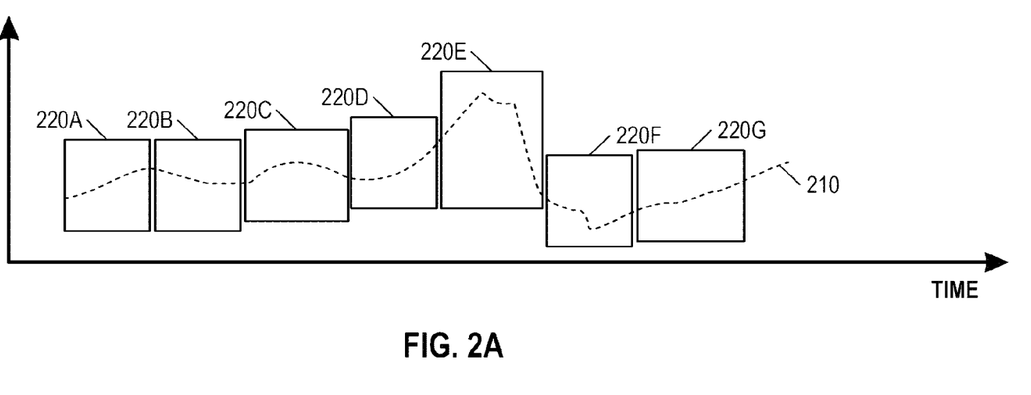
FIGS. 2A-B illustrate, by way of example and not limitation, a diagram of adaptive down-sampling of sensor measurements.
Figure 2B:
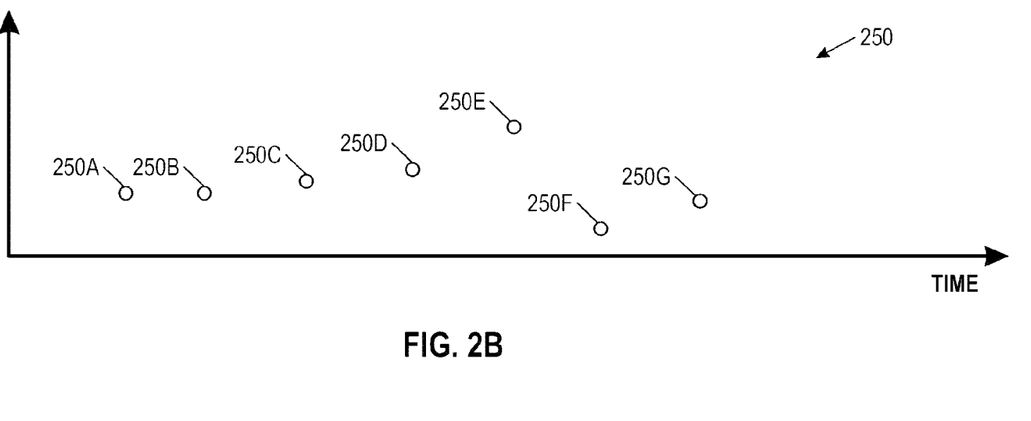

The signal processor module 120 may generate from the pre-processed sensor measurements a feature vector associated with a gesture. As illustrated in FIG. 2, the signal processor module 120 may include a resampler module 122, a normalizer module 124, and a feature generator module 126. The resampler module 122 may down-sample the plurality of sensor measurements at an adaptive down-sampling interval to produce down-sampled measurements having a target length of $N_T$. The present inventors have recognized that gestures of the same type may have different speed or different duration (e.g., different duration of a gesture sensing session). The resulting measurements, which correspond to different instances of the same type of gesture, may manifest inter- or intra-user variations in data length that. Down-sampling the sensor measurements during a gesture sensing session, such as by using resampler module 122, may reduce the effect of variation in action speed or action duration of the sensor measurements, thereby improving the robustness of gesture recognition. Down-sampling the sensor measurement may also reduce power consumption and computational demand for gesture recognition.

In an example, the target length $N_T$ is a pre-determined fixed length shorter than the frame length $N_{Frame}$. The adaptive down-sampling interval ($L_S$) indicates a count of data samples in the pre-processed sensor measurement used for produce one down-sampled measurement. For example, an $L_S$=10 indicates that a down-sampled measurement is derived from every ten pre-processed sensor measurements.

The adaptive down-sampling interval may be determined based at least on a fractional part of a ratio (R) of the frame length $N_{Frame}$ to the target length $N_T$. If $N_{Frame}$ is divisible by $N_T$, the down-sampling interval $L_S$ is determined to be equal to the ratio R. If the $N_{Frame}$ is not divisible by $N_T$, the ratio R has an integer part $R_I$ and a fractional part RF, that is, $R=N_{Frame}/N_T=R_I+R_F$, where $0<R_F<1$. The resampler module 122 may accumulate the fractional part ($R_F$) for each resampling operation (i.e., $aR_F=aR_F+R_F$), and determine an adaptive down-sampling interval as a function of $R_I$ and the accumulated $R_F$ ($aR_F$). In an example, the resampler module 122 may set the adaptive down-sampling interval $L_S$ to $R_I$ if $aR_F$ is less than one. If the $aR_F$ is equal to or greater than one, then the resampler module 122 may set the $L_S$ to $R_I$+1, and update $aR_F$ by subtracting one from $aR_F$. That is, $$L_S = \begin{cases} R_I, & \text{if } aR_F < 1 \\ R_I + 1, & \text{if } aR_F \geq 1 \end{cases} \quad (1)$$

As an example, the pre-processed sensor measurements during a gesture sensing session (i.e., a frame) have a length of $N_{Frame}$=129 data samples. To down-sample the measurements to a fixed target length $N_T$=20, the down-sampling ratio R=129/20=6.45, that is, $R_I$=6 and $R_F$=0.45. Table 1 illustrates the adaptive down-sampling interval $L_S$ as determined based at least on the accumulated fractional part $aR_F$. The 129 samples may be divided into a plurality of consecutive data blocks, where each data block has a respective length equal to $L_S$ and begins at the next sample following the end of the preceding block. As illustrated in Table 1, the first block, beginning at index 0, has a length $L_S(1)=R_I$=6. The fractional part $R_F$=0.45 is applied to the second block that begins at index 6. Because the accumulated fractional part $aR_F(2)$=0.45<1, the down-sampling interval for the second block remains to be $L_S(2)=R_I$=6. Similarly, for block 3, the accumulated $aR_F(3)$=0.45+0.45=0.9<1, rendering $L_S(3)$=6. For block 4, which begins at sample index 19, the accumulated $aR_F(4)$=0.45*3=1.35>1. The resampler module 122 may then set the $L_S(4)=R_I$+1=7, and update the $aR_F$ by decrementing $aR_F$ by 1, that is, $aR_F=aR_F$−1=0.35. The adaptive down-sampling process may proceed to the end of the sensor measurements. The resulting 20 data blocks have variable block length $L_S$ adaptively determined based on the accumulated fractional part $aR_F$.

TABLE 1

An example of adaptive down-sampling of measurements.

| | Block index | | | | | | | | | | |
|---|---|---|---|---|---|---|---|---|---|---|---|
| | 1 | 2 | 3 | 4 | 5 | 6 | 7 | 8 | 9 | 10 | 11 |
| $aR_F$ | 0 | 0.45 | 0.9 | 1.35 | 1.8 | 2.25 | 2.7 | 3.15 | 3.6 | 4.05 | 4.5 |
| Updated $aR_F$ | 0 | 0.45 | 0.9 | 0.35 | 0.8 | 0.25 | 0.7 | 0.15 | 0.6 | 0.05 | 0.5 |
| Block Length ($L_S$) | 6 | 6 | 6 | 7 | 6 | 7 | 6 | 7 | 6 | 7 | 6 |
| Beginning index | 0 | 6 | 13 | 19 | 26 | 32 | 39 | 45 | 52 | 58 | 64 |

TABLE 1-continued

An example of adaptive down-sampling of measurements.

|  | Block index | | | | | | | | |
| --- | --- | --- | --- | --- | --- | --- | --- | --- | --- |
|  | 12 | 13 | 14 | 15 | 16 | 17 | 18 | 19 | 20 |
| $aR_F$ | 4.95 | 5.4 | 5.85 | 6.3 | 6.75 | 7.2 | 7.65 | 8.1 | 8.55 |
| Updated $aR_F$ | 0.95 | 0.4 | 0.85 | 0.3 | 0.75 | 0.2 | 0.65 | 0.1 | 0.55 |
| Block Length ($L_S$) | 6 | 7 | 6 | 7 | 6 | 7 | 6 | 7 | 6 |
| Beginning index of block | 71 | 77 | 84 | 90 | 97 | 103 | 110 | 116 | 122 |

The resampler module 122 may down-sample the plurality of sensor measurements by replacing each data block (having a length of $L_S$) with a corresponding representative value. Examples of the representative value may include a mean, a median, a mode, or other central tendency index of the measurements within each data block. In an example, the resample module 122 may include an average filter module 123 that may generate an average value of sensor measurements within each data block, where each data block has a respective length equal to the adaptive down-sampling interval $L_S$. Taking an average of the sensor measurements within a data block may reduce noise or undesirable interferences in the sensor measurements.

The normalizer module 124, coupled to the resampler module 122, may normalize the magnitude of the down-sampled measurements and produce normalized measurements. The present inventors have recognized that gestures of the same type may have different signatures of signal intensity, such as magnitude of an acceleration signal sensed by an accelerometer. Normalization, such as by using the normalizer module 124, may reduce the inter- or intra-user variation across different instances of the same type of gesture, thereby improving the robustness of gesture recognition. The normalizer module 124 may include a quantization module to quantize the down-sampled measurements to a specified range. The normalizer module 124 may further normalize the quantized measurements using an empirical factor.

The feature generator module 126 may generate a feature vector using the normalized measurements provided by the normalizer module 124. The feature vector may include morphological or statistical features. In an example, the feature vector may include characteristic data samples extracted from the normalized measurements, such as a peak, a trough, a local maximum, a local minimum, a maximal slope, a minimal slope, or an inflection point, among others. The feature vector may also include timing information of the characteristic data samples included in the feature vector.

The gesture recognizer module 130 may associate a gesture with the feature vector. In an example, the gesture recognizer module 130 may include one or more classifiers that classify the feature vector to one of a plurality of specified target gesture classes, such as hand gestures corresponding to commands for operating a mobile device such as a smartphone or a tablet. The hand gestures may include one or multiple finger gestures, or palm or arm gestures. Examples of hand gesture classes may include tapping or repeated tapping, holding, swiping to one of a plurality of directions, multiple finger movement, spreading, pinching, rotating at one of a plurality of orientations, shaking, flicking, or bumping to one of a plurality of directions, among others.

In an example, the gesture recognizer module 130 may classify the feature vector using a rule-based classifier, such as a decision-tree. In an example, the gesture recognizer module 130 may classify the feature vector using a template matching between the feature vector and a gesture template, where a similarity score such as a multi-dimensional distance between the normalized measurements and a gesture template may be determined, and a gesture classification may be made based on a comparison of the similarity score and a threshold value. One or more of other linear or nonlinear classifiers may be used, including a regression model, a neural network classifier, a support vector machine, a hidden Markov model, a random forest classifier, a voting model, or a fuzzy logic model, among others. As illustrated in FIG. 1, the gesture recognizer module 130 may be coupled to a memory 140 that stores classifiers and the association parameters such as rules, threshold values, or templates for use in the classification of the feature vector. The classified feature vector may additionally be stored in the memory 140, and may be used to update the template or other classification parameters for future gesture recognition.

The optional output module 150 may associate the recognized gesture with a user-intended action and produce a command of operating the wearable device, such as to open or close an application ("App") or other interactions with the mobile device.

FIGS. 2A-B illustrate, by way of example and not limitation, a diagram of adaptive down-sampling of the sensor measurements, such as by using the resampler module 122 in FIG. 1. FIG. 2A illustrates sensor measurements 210 which may be a portion of a discrete-time signal produced by the sensor module 110, such as an acceleration signal acquired during a gesture sensing session. The measurements 210 of a length (number of data samples) of $N_{Frame}$ may be down-sampled to a target length $N_T$ by using an adaptive down-sampling interval $L_S$, such as described previously with reference to the resampler module 122. A plurality of consecutive data blocks 220A-G may be generated, each having respective block length $L_S$. The block length $L_S$ may be adaptively determined based on the fractional part ($R_F$) of the down-sampling ratio $N_{Frame}/N_T$, such as according to Equation (1). As illustrated in FIG. 2A, the block lengths for block 220C, 220E, or 220G are each longer than the block lengths of 220A, 220B, 220D, or 220F. FIG. 2B illustrates down-sampled measurements 250A-G. Each data sample of the down-sampled measurements 250 is taken as a representative value of the corresponding data block. In an example, the representative values 250A-G may each be calculated as an average of the data samples within the respective data blocks 220A-G, such as produced by the average filter module 123. The resulting down-sampled measurements 250A-G may be normalized to extract a feature vector for use in gesture recognition.

Figure 3A:
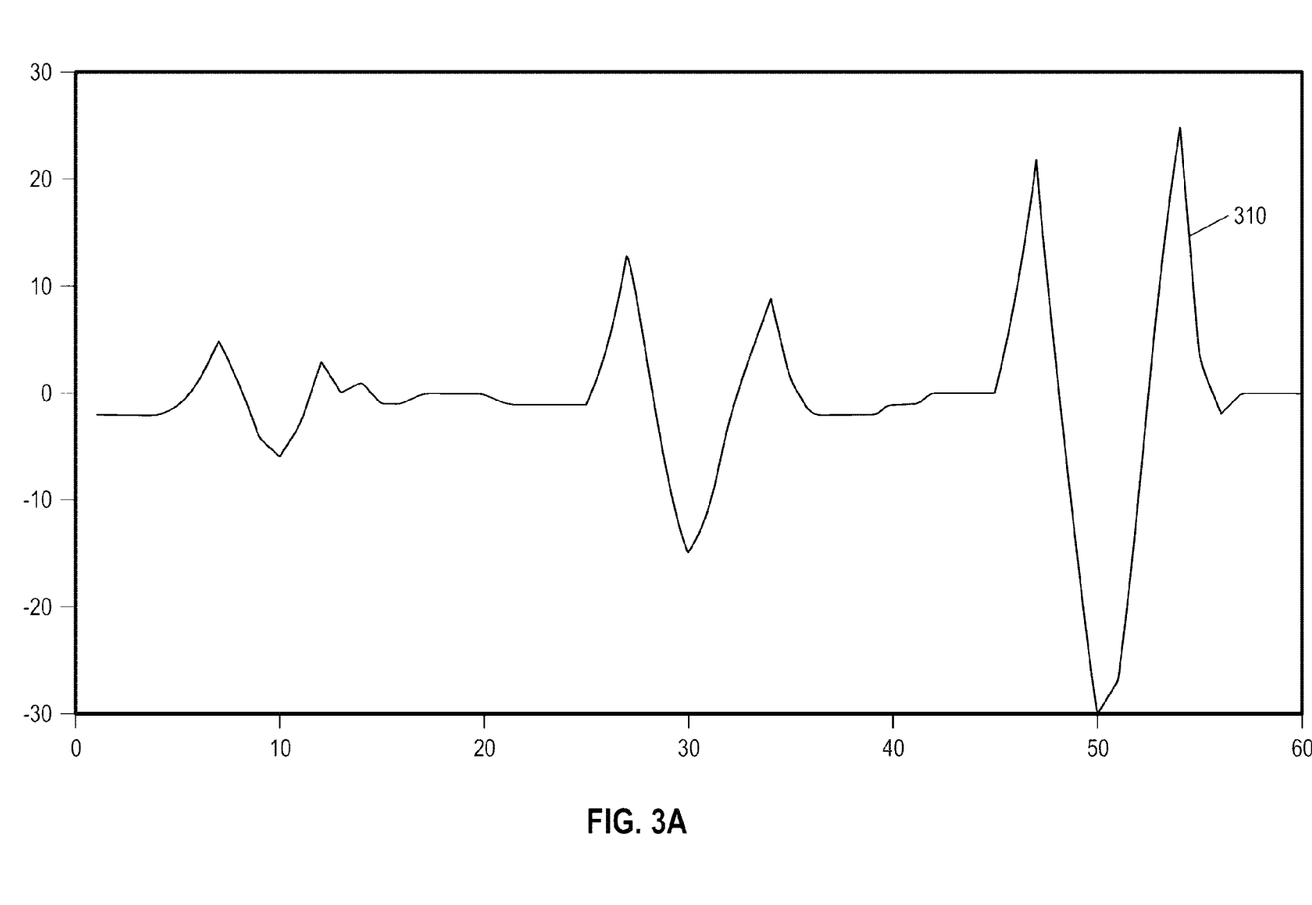
FIGS. 3A-B illustrate, by way of example and not limitation, graphs of resampled and normalized sensor measurements.
Figure 3B:
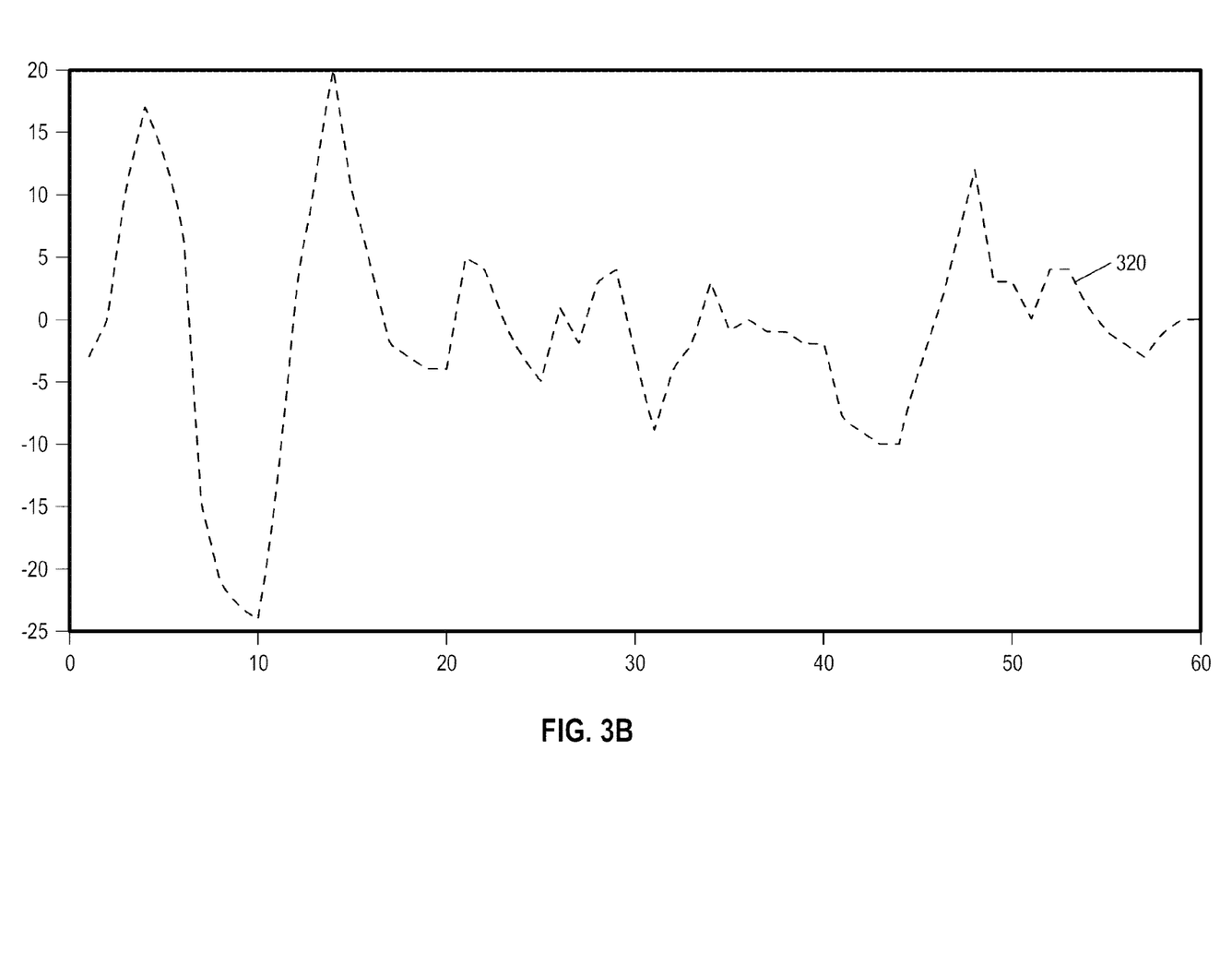

FIGS. 3A-B illustrate, by way of example and not limitation, graphs of resampled and normalized measurements sensed by an accelerometer and processed by the signal processor module 120. The measurements 310 shown in FIG. 3A are taken during a first gesture sensing session and correspond to a first gesture. The normalized measurements 320 shown in FIG. 3B are taken during a second gesture sensing session and correspond to a second gesture different than the first gesture. Through the down-sampling process, the measurements 310 and 320 have identical target data length of $N_T$=60 samples. The measurements 310 have different signal morphology than the measurement 310 including magnitude and timing of the global peak and trough and of the local peaks and troughs. Feature vectors that include morphological features and the timings may be respectively generated from the measurements 310 and 320, and used for gesture recognition such as by using template matching or other classifiers as discussed previously with reference to FIG. 1.

Figure 4:
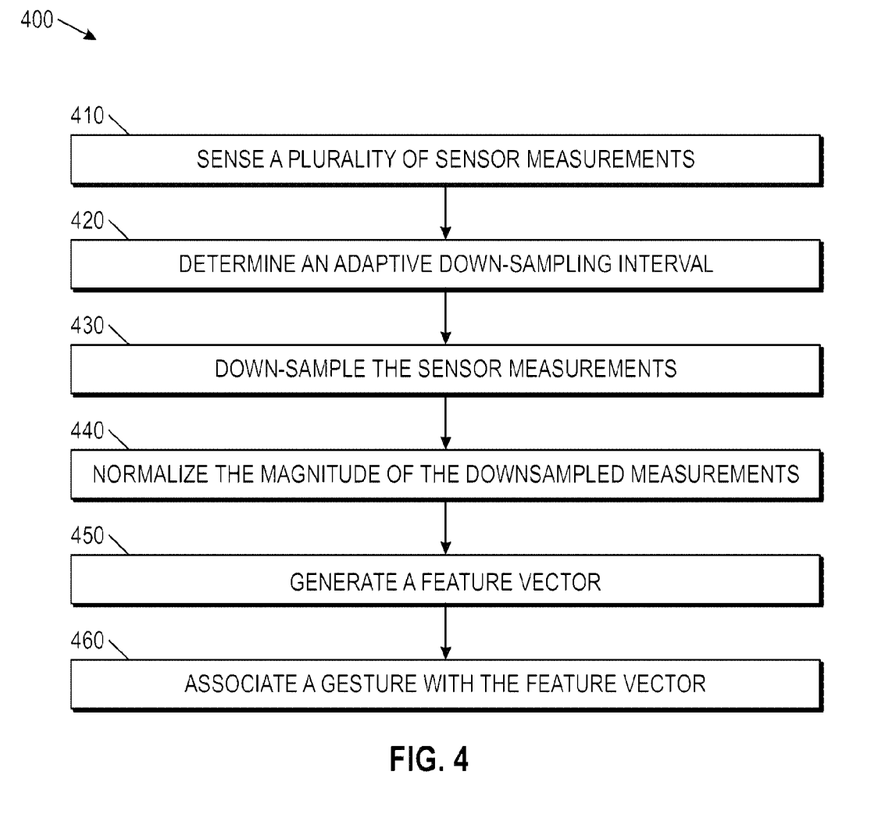
FIG. 4 illustrates, by way of example and not limitation, a method for recognizing a gesture in a wearable device.

FIG. 4 illustrates, by way of example and not limitation, a method 400 for recognizing a gesture in a wearable device. The method 400 may be implemented and executable in the system 100 or a modification thereof. In an example, the method 400 may be implemented and executable in a wearable device such as a smartwatch, a wearable activity tracker, or a smartphone.

The method 400 may begin at 410 by sensing a plurality of sensor measurements during a gesture sensing session, such as by using a sensor module 110. Examples of the senor measurements may include acceleration signals sensed by an accelerometer, orientation measurements sensed by a gyroscope, pressure signals sensed by a pressure sensor, or temperature measurements sensed by a temperature sensor, among others. The sensor measurements may be processed to create a discrete-time digital signal with a particular frame length ($N_{Frame}$).

At 420, an adaptive down-sampling interval ($L_S$) may be determined. Down-sampling the sensor measurements during a gesture sensing session may improve the robustness of gesture recognition by reducing the effect of variation in action speed or duration on the sensor measurements. The adaptive down-sampling interval may be determined using a ratio of the frame length $N_{Frame}$ to a pre-determined target length $N_T$. If $N_{Frame}$ is divisible by $N_T$, the down-sampling interval $L_S$ is determined to be equal to the ratio R. If the $N_{Frame}$ is not divisible by $N_T$, the ratio R may have an integer part $R_I$ and a fractional part $R_F$, where $0<R_F<1$. The fractional part ($R_F$) for each resampling operation may be accumulated. The accumulated $R_F$, $aR_F$, may be updated for each down-sampling operation. In an example, if $aR_F$ is equal to or greater than one, then $aR_F$ is decremented by one. The $L_S$ may then be determined as a function of $R_I$ and the accumulated $R_F$ ($aR_F$), such as determined according to Equation (1).

At 430, the sensor measurements may be down-sampled at the adaptive down-sampling interval as determined at step 420 to produce down-sampled measurements with the target length $N_T$. The sensor measurements may be divided into a plurality of consecutive data blocks, such as the data blocks 220A-G as illustrated in FIG. 2A. Each data block has a respective length equal to $L_S$ and begins at the next sample after the end of the preceding block. A representative value may be determined for each data block, such as a mean, a median, a mode, or other central tendency index of the measurements within each data block. Taking a central tendency index of the sensor measurements within a data block may reduce noise or other undesired interference in the sensor measurements.

At 440, the magnitude of the down-sampled measurements may be normalized to produce normalized measurements. Normalization, such as by using the normalizer module 124, may reduce the inter- or intra-user variation across different instances of the same type of gesture. Examples of the magnitude normalization may include quantization of the down-sampled measurements to a specified range, or normalization of the quantized measurements using an empirical factor.

At 450, a feature vector may be generated from the normalized measurements. The feature vector may include morphological or statistical features, such as characteristic data samples extracted from the normalized measurements. Examples of the characteristic data samples may include a peak, a trough, a local maximum, a local minimum, a maximal slope, a minimal slope, or an inflection point, among others. The feature vector may also include timing information of the characteristic data samples.

At 460, the feature vector may be associated with one of a plurality of specified target gesture classes, such as hand gestures (including one or multiple finger gestures, or palm/arm gestures) corresponding to commands for operating a mobile device such as a smartphone or a tablet. Examples of hand gesture classes may include tapping or repeated tapping, holding, swiping to one of a plurality of directions, multiple finger movement, spreading, pinching, rotating at one of a plurality of orientations, shaking, flicking, or bumping to one of a plurality of directions, among others. Examples of the gesture classification may include linear or nonlinear classifiers, such as a rule-based classifier, a decision-tree, template matching, a regression model, a neural network classifier, a support vector machine classifier, a hidden Markov model, a random forest classifier, a voting model, or a fuzzy logic model, among others. The recognized gesture may be associated with user-intended action and produce a command of operating the wearable device.

Figure 5:
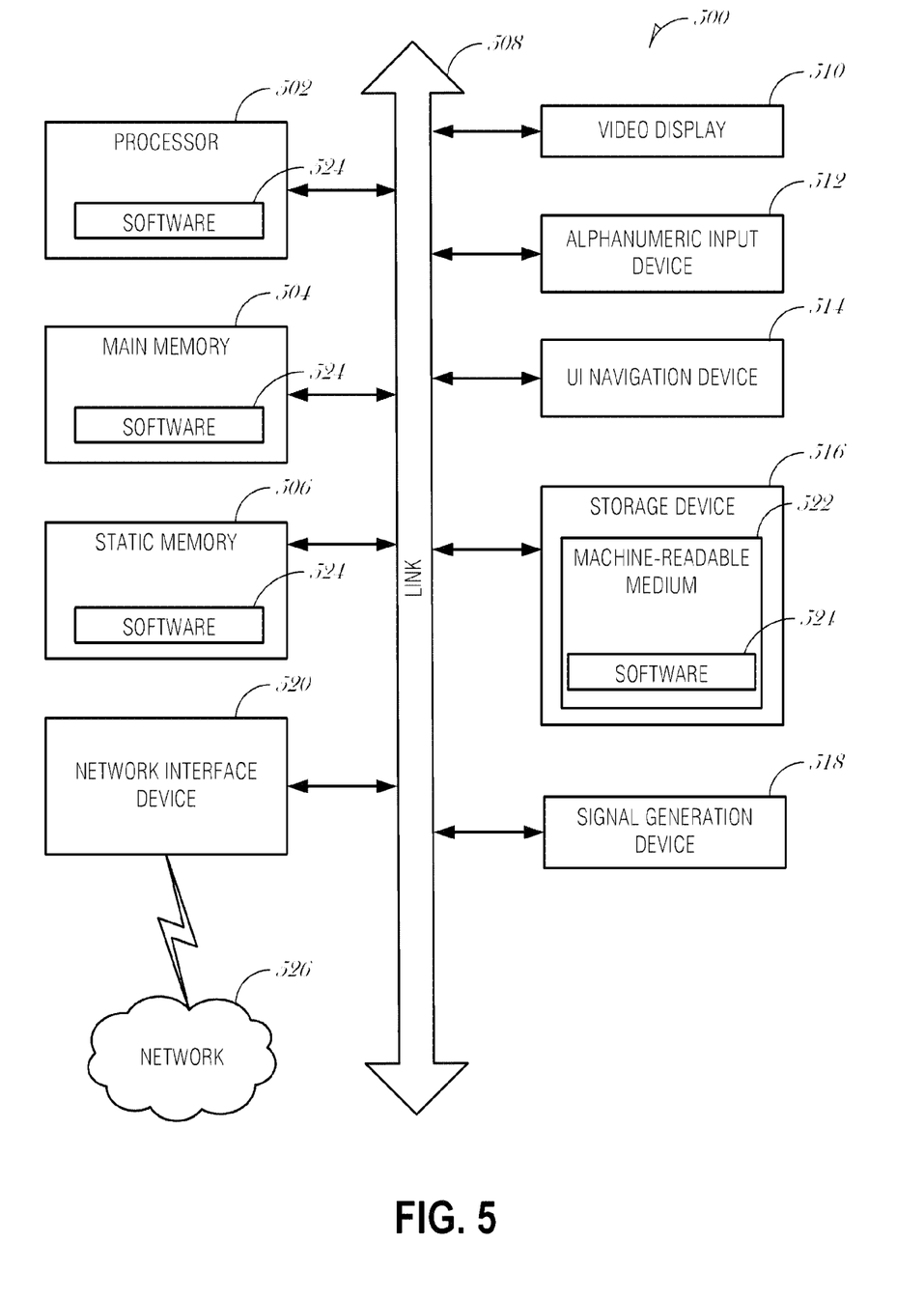
FIG. 5 illustrates, by way of example of not limitation, a block diagram illustrating an example machine upon which any one or more of the techniques discussed herein may perform, according to an example embodiment.

FIG. 5 illustrates, by way of example of not limitation, a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media. In an example, the instructions 524 stored in the machine-readable storage medium 522 include instructions causing the computer system 500 to sense, during a gesture sensing session, a plurality of sensor measurements with a frame length. The instructions 524 may also cause the computer system 500 to determine an adaptive down-sampling interval based at least on a fractional part of a ratio of the frame length to a target length shorter than the frame length, to down-sample the plurality of sensor measurements at the adaptive down-sampling interval to produce down-sampled measurements with the target length, to normalize the magnitude of the down-sampled measurements to produce normalized measurements, to generate a feature vector using the normalized measurements, and to associate a gesture with the feature vector.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In this document, embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Additional Notes & Examples

Example 1 is a system for recognizing a gesture in a wearable device. The system may comprise a signal processor module and a gesture recognizer module. The signal processor module may include: a resampler module to down-sample a plurality of sensor measurements with a frame length using an adaptive down-sampling interval to produce down-sampled measurements with a target length shorter than the frame length, the adaptive down-sampling interval determined based at least on a fractional part of a ratio of the frame length to the target length; a normalizer module to normalize the magnitude of the down-sampled measurements to produce normalized measurements; and a feature generator module to generate a feature vector using the normalized measurements. The gesture recognizer module may associate a gesture with the feature vector.

In Example 2, the subject matter of Example 1 optionally includes the resampler module that may generate a representative value of sensor measurements within each of a plurality of data blocks, each data block having a respective length equal to the adaptive down-sampling interval. The resampler module may produce the down-sampled measurements using the representative values of the plurality of data blocks.

In Example 3, the subject matter of Example 2 optionally includes the resampler module that may further include an average filter module to generate the representative value including an average value of the sensor measurements within each data block.

In Example 4, the subject matter of any one or more of Examples 1-3 optionally includes the target length of the down-sampled measurements that has a predetermined fixed value.

In Example 5, the subject matter of any one or more of Examples 1-3 optionally includes the resampler module that may determine an integer part (RI) and a fractional part (RF) of a ratio of the frame length to the targeted length, accumulate the RF for each resampling operation, and determine the adaptive down-sampling interval as a function of the RI and the accumulated RF.

In Example 6, the subject matter of Example 5 optionally includes the resampler module that may, in response to the accumulated RF being less than one, set the adaptive down-sampling interval to RI; and in response to the accumulated RF being greater than or equal to one, set the adaptive down-sampling interval to RI −1 and update the accumulated RF by subtracting one from the accumulated RF.

In Example 7, the subject matter of any one or more of Examples 1-3 optionally includes the normalizer module that may include a quantization module to quantize the down-sampled measurements to a specified range.

In Example 8, the subject matter of Example 7 optionally includes the normalizer module that may normalize the quantized measurements using an empirical factor.

In Example 9, the subject matter of any one or more of Examples 1-3 optionally includes a sensor module including a sense amplifier to sense the plurality of sensor measurements during a gesture sensing session.

In Example 10, the subject matter of Example 9 optionally includes the sensor module that may include at least one of an accelerometer module to produce a plurality of acceleration measurements or a gyroscope module to produce a plurality of orientation measurements.

In Example 11, the subject matter of any one or more of Examples 1-3 optionally includes the feature vector generation module that may generate a feature vector including morphological features extracted from the normalized measurements.

In Example 12, the subject matter of any one or more of Examples 1-3 optionally includes the gesture recognizer module that may associate a gesture with the feature vector by classifying the feature vector into one of a plurality of specified target gesture classes.

In Example 13, the subject matter of Example 12 optionally includes the plurality of specified target gesture classes that may include a plurality of hand gestures.

In Example 14, the subject matter of any one or more of Examples 12-13 optionally includes the gesture recognizer module that may classify the feature vector using a support vector machine classifier.

In Example 15, the subject matter of any one or more of Examples 1-3 optionally includes the signal processor circuit that may further pre-process the plurality of sensor measurements including remove mean value from the plurality of sensor measurements, and the resampler module that may down-sample the pre-processed sensor measurements.

In Example 16, the subject matter of any one or more of Examples 1-3 optionally includes the wearable device that may include at least one or more of the signal processor module or the gesture recognizer module.

In Example 17, the subject matter of Example 16 optionally includes the wearable device that may include one of a smartphone, a smartwatch, smart glasses, a wearable fitness or activity tracker, or a wearable health monitor.

In Example 18, the subject matter of any one or more of Examples 1-3 optionally includes an output module to produce a command to operate the wearable device based on the recognized gesture.

Example 19 is a method for recognizing a gesture in a wearable device, the method may comprise: sensing, using a sensor module, a plurality of sensor measurements with a frame length during a gesture sensing session; determining an adaptive down-sampling interval based at least on a fractional part of a ratio of the frame length to a specified target length shorter than the frame length; down-sampling the plurality of sensor measurements using the adaptive down-sampling interval to produce down-sampled measurements with the target length; normalizing a magnitude of the down-sampled measurements to produce normalized measurements; generating a feature vector using the normalized measurements; and associating a gesture with the feature vector.

In Example 20, the subject matter of Example 19 optionally includes down-sampling the plurality of sensor measurements that may include generating a representative value of sensor measurements within each of a plurality of data blocks, each data block having a respective length equal to the adaptive down-sampling interval, and down-sampling the representative values of the plurality of data blocks.

In Example 21, the subject matter of Example 20 optionally includes the representative value that may include an average value of the sensor measurements within each data block.

In Example 22, the subject matter of any one or more of Examples 19-21 optionally includes the target length of the down-sampled measurements that has a predetermined fixed value.

In Example 23, the subject matter of any one or more of Examples 19-21 optionally includes down-sampling the plurality of sensor measurements that may include: determining an integer part (RI) and a fractional part (RF) of a ratio of the frame length to the targeted length; accumulating the RF for each resampling operation; determining the adaptive down-sampling interval as a function of the RI and the accumulated RF.

In Example 24, the subject matter of Example 23 optionally includes determining the adaptive down-sampling interval that may include: in response to the accumulated RF being less than one, setting the adaptive down-sampling interval to RI; and in response to the accumulated RF being greater than or equal to one, setting the adaptive down-sampling interval to RI −1, and updating the accumulated RF by subtracting one from the accumulated RF.

In Example 25, the subject matter of any one or more of Examples 19-21 optionally includes normalizing the magnitude of the down-sampled measurements that may include quantizing the down-sampled measurements to a specified range.

In Example 26, the subject matter of Example 25 optionally includes the down-sampled measurements that may be quantized using an empirical factor.

In Example 27, the subject matter of any one or more of Examples 19-21 optionally includes sensing the plurality of sensor measurements that may include sensing a plurality of acceleration measurements using an accelerometer.

In Example 28, the subject matter of any one or more of Examples 19-21 optionally includes sensing the plurality of sensor measurements that may include sensing a plurality of orientation measurements using a gyroscope.

In Example 29, the subject matter of any one or more of Examples 19-21 optionally includes generating the feature vector that may include extracting morphological features from the normalized measurements.

In Example 30, the subject matter of any one or more of Examples 19-21 optionally includes associating the gesture with the feature vector that may include classifying the feature vector into one of a plurality of specified target gesture classes.

In Example 31, the subject matter of Example 30 optionally includes the plurality of specified target gesture classes that may include a plurality of hand gestures.

In Example 32, the subject matter of Example 30 optionally includes classifying the feature vector that may include using a support vector machine classifier to classify the feature vector.

In Example 33, the subject matter of any one or more of Examples 19-21 optionally includes pre-processing the plurality of sensor measurements including removing mean value from the plurality of sensor measurements, wherein down-sampling the plurality of sensor measurements may include down-sampling the pre-processed sensor measurements.

In Example 34, the subject matter of any one or more of Examples 19-21 optionally includes producing a command to operate the wearable device based on the recognized gesture.

Example 35 is at least one computer-readable storage medium that comprises instructions to perform any of the methods of Examples 19 through 34.

Example 36 is a system comprising means for performing any of the methods of Examples 19 through 34.

Example 37 is a system for recognizing a gesture in a wearable device, the apparatus may comprise: means for sensing, using a sensor module, a plurality of sensor measurements with a frame length during a gesture sensing session; means for determining an adaptive down-sampling interval based at least on a fractional part of a ratio of the frame length to a specified target length shorter than the frame length; means for down-sampling the plurality of sensor measurements using the adaptive down-sampling interval to produce down-sampled measurements with the target length; means for normalizing a magnitude of the down-sampled measurements to produce normalized measurements; means for generating a feature vector using the normalized measurements; and means for associating a gesture with the feature vector.

In Example 38, the subject matter of Example 37 optionally includes, wherein: the means for down-sampling the plurality of sensor measurements includes means for generating a representative value of sensor measurements within each of a plurality of data blocks, each data block having a respective length equal to the adaptive down-sampling interval; and the means for down-sampling the plurality of sensor measurements includes means for down-sampling the representative values of the plurality of data blocks.

In Example 39, the subject matter of Example 38 optionally includes the representative value that may include an average value of the sensor measurements within each data block.

In Example 40, the subject matter of any one or more of Examples 37-39 optionally includes the target length of the down-sampled measurements that has a predetermined fixed value.

In Example 41, the subject matter of any one or more of Examples 37-39 optionally includes the means for down-sampling the plurality of sensor measurements that may include: means for determining an integer part (RI) and a fractional part (RF) of a ratio of the frame length to the targeted length; means for accumulating the RF for each resampling operation; means for determining the adaptive down-sampling interval as a function of the RI and the accumulated RF.

In Example 42, the subject matter of Example 41 optionally includes the means for determining the adaptive down-sampling interval that may include: means for setting the adaptive down-sampling interval to RI in response to the accumulated RF being less than one; and means for setting the adaptive down-sampling interval to RI −1 and updating the accumulated RF by subtracting one from the accumulated RF in response to the accumulated RF being greater than or equal to one.

In Example 43, the subject matter of any one or more of Examples 37-39 optionally includes the means for normalizing the magnitude of the down-sampled measurements that may include means for quantizing the down-sampled measurements to a specified range.

In Example 44, the subject matter of Example 43 optionally includes the means for quantizing the down-sampled measurements that may include means for using an empirical factor to quantize the down-sampled measurements.

In Example 45, the subject matter of any one or more of Examples 37-39 optionally includes the means for sensing the plurality of sensor measurements that may include means for sensing a plurality of acceleration measurements using an accelerometer.

In Example 46, the subject matter of any one or more of Examples 37-39 optionally includes the means for sensing the plurality of sensor measurements that may include means for sensing a plurality of orientation measurements using a gyroscope.

In Example 47, the subject matter of any one or more of Examples 37-39 optionally includes the means for generating the feature vector that may include means for extracting morphological features from the normalized measurements.

In Example 48, the subject matter of any one or more of Examples 37-39 optionally includes the means for associating the gesture with the feature vector that may include means for classifying the feature vector into one of a plurality of specified target gesture classes.

In Example 49, the subject matter of Example 48 optionally includes the plurality of specified target gesture classes that may include a plurality of hand gestures.

In Example 50, the subject matter of Example 48 optionally includes the means for classifying the feature vector that may include means for using a support vector machine classifier to classify the feature vector.

In Example 51, the subject matter of any one or more of Examples 37-39 optionally includes means for pre-processing the plurality of sensor measurements including means for removing mean value from the plurality of sensor measurements, wherein the means for down-sampling the plurality of sensor measurements includes means for down-sampling the pre-processed sensor measurements.

In Example 52, the subject matter of any one or more of Examples 37-39 optionally includes means for producing a command to operate the wearable device based on the recognized gesture.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for recognizing a gesture in a wearable device, the system comprising:
    a signal processor module, including:
        a resampler module to down-sample a plurality of sensor measurements with a frame length using an adaptive down-sampling interval to produce down-sampled measurements with a target length shorter than the frame length, the adaptive down-sampling interval determined based at least on a fractional part of a ratio of the frame length to the target length;
        a normalizer module to normalize the magnitude of the down-sampled measurements to produce normalized measurements; and
        a feature generator module to generate a feature vector using the normalized measurements; and
    a gesture recognizer module to associate a gesture with the feature vector.

2. The system of claim 1, wherein the resampler module is to generate a representative value of sensor measurements within each of a plurality of data blocks, each data block having a respective length equal to the adaptive down-sampling interval; and
    wherein the resampler module is to produce the down-sampled measurements using the representative values of the plurality of data blocks.

3. The system of claim 2, wherein the resampler module further includes an average filter module to generate the representative value including an average value of the sensor measurements within each data block.

4. The system of claim 1, wherein the resampler module is to:
    determine an integer part (RI) and a fractional part (RF) of a ratio of the frame length to the targeted length;
    accumulate the RF for each resampling operation; and
    determine the adaptive down-sampling interval as a function of the RI and the accumulated RF.

5. The system of claim 4, wherein the resampler module is to:

in response to the accumulated RF being less than one, set the adaptive down-sampling interval to RI; and in response to the accumulated RF being greater than or equal to one, set the adaptive down-sampling interval to RI −1, and update the accumulated RF by subtracting one from the accumulated RF.

6. The system of claim 1, wherein the normalizer module includes a quantization module to quantize the down-sampled measurements to a specified range.

7. The system of claim 1, further comprising a sensor module including a sense amplifier to sense the plurality of sensor measurements during a gesture sensing session.

8. The system of claim 7, wherein the sensor module includes at least one of an accelerometer module to produce a plurality of acceleration measurements or a gyroscope module to produce a plurality of orientation measurements.

9. The system of claim 1, wherein the feature vector generation module is to generate a feature vector including morphological features extracted from the normalized measurements.

10. The system of claim 1, wherein the gesture recognizer module is to associate a gesture with the feature vector by classifying the feature vector into one of a plurality of specified target gesture classes.

11. A method for recognizing a gesture in a wearable device, the method comprising:

sensing, using a sensor module, a plurality of sensor measurements with a frame length during a device gesture sensing session;

determining an adaptive down-sampling interval based at least on a fractional part of a ratio of the frame length to a specified target length shorter than the frame length;

down-sampling the plurality of sensor measurements using the adaptive down-sampling interval to produce down-sampled measurements with the target length;

normalizing a magnitude of the down-sampled measurements to produce normalized measurements;

generating a feature vector using the normalized measurements; and associating a gesture with the feature vector.

12. The method of claim 11, wherein down-sampling the plurality of sensor measurements includes generating a representative value of sensor measurements within each of a plurality of data blocks, each data block having a respective length equal to the adaptive down-sampling interval, and down-sampling the representative values of the plurality of data blocks.

13. The method of claim 11, wherein down-sampling the plurality of sensor measurements includes:

determining an integer part (RI) and a fractional part (RF) of a ratio of the frame length to the targeted length;

accumulating the RF for each resampling operation;

determining the adaptive down-sampling interval as a function of the RI and the accumulated RF.

14. The method of claim 13, wherein determining the adaptive down-sampling interval includes:

in response to the accumulated RF being less than one, setting the adaptive down-sampling interval to RI; and in response to the accumulated RF being greater than or equal to one, setting the adaptive down-sampling interval to RI −1, and updating the accumulated RF by subtracting one from the accumulated RF.

15. The method of claim 11, wherein normalizing the magnitude of the down-sampled measurements includes quantizing the down-sampled measurements to a specified range.

16. At least one non-transitory machine readable storage medium, comprising a plurality of instructions that, responsive to being executed with processor circuitry of a computing device, cause the computing device to:

sense, using a sensor module, a plurality of sensor measurements with a frame length during a device gesture sensing session;

determine an adaptive down-sampling interval based at least on a fractional part of a ratio of the frame length to a specified target length shorter than the frame length;

down-sample the plurality of sensor measurements using the adaptive down-sampling interval to produce down-sampled measurements with the target length;

normalize a magnitude of the down-sampled measurements to produce normalized measurements;

generate a feature vector using the normalized measurements; and associate a gesture with the feature vector.

17. The at least one non-transitory machine-readable storage medium of claim 16, wherein:

the operations that down-sample the plurality of sensor measurements include operations that generate a representative value of sensor measurements within each of a plurality of data blocks, each data block having a respective length equal to the adaptive down-sampling interval; and the operations that down-sample the plurality of sensor measurements include operations that down-sample the representative values of the plurality of data blocks.

18. The at least one non-transitory machine-readable storage medium of claim 16, wherein the operations that down-sample the plurality of sensor measurements further include operations that:

determine an integer part (RI) and a fractional part (RF) of a ratio of the frame length to the targeted length;

accumulate the RF for each resampling operation; and determine the adaptive down-sampling interval as a function of the RI and the accumulated RF.

19. The at least one non-transitory machine-readable storage medium of claim 18, wherein the operations that determine the adaptive down-sampling interval include operations that:

set the adaptive down-sampling interval to RI in response to the accumulated RF being less than one; and set the adaptive down-sampling interval to RI −1 and update the accumulated RF by subtracting one from the accumulated RF in response to the accumulated RF being greater than or equal to one.

20. The at least one non-transitory machine-readable storage medium of claim 16, wherein the operations that associate the gesture with the feature vector include operations that classify the feature vector into one of a plurality of specified target gesture classes.

* * * * *